(12) United States Patent
Hughes et al.

(10) Patent No.: US 9,058,334 B2
(45) Date of Patent: Jun. 16, 2015

(54) PARALLEL FILE SYSTEM PROCESSING

(75) Inventors: Jeffrey Douglas Hughes, Seattle, WA (US); Sean MacQueen Smith, Seattle, WA (US); Kalen Albert Petersen, Seattle, WA (US); Eric Michael Lemar, Seattle, WA (US)

(73) Assignee: EMC CORPORATION, Hopkinton, MA (US)

( * ) Notice: Subject to any disclaimer, the term of this patent is extended or adjusted under 35 U.S.C. 154(b) by 617 days.

(21) Appl. No.: 12/704,285

(22) Filed: Feb. 11, 2010

(65) Prior Publication Data

US 2011/0196899 A1 Aug. 11, 2011

(51) Int. Cl.
*G06F 17/00* (2006.01)
*G06F 15/16* (2006.01)
*G06F 17/30* (2006.01)

(52) U.S. Cl.
CPC ................... *G06F 17/30091* (2013.01)

(58) Field of Classification Search
CPC ............ H04L 67/1008; H04L 67/1095; H04L 67/2876; G06F 2206/1012; G06F 9/505; G06F 9/5038; G06F 9/4881; G06F 9/3009; G06F 9/5088; G06F 9/45533; G06F 9/5083; G06F 15/16; G06F 9/485; G06F 3/126
USPC ......... 707/809, 812, 821, 822, 828, 829, 831, 707/899, E17.01, E17.032, E17.044; 709/219
See application file for complete search history.

(56) References Cited

U.S. PATENT DOCUMENTS

| | | | | |
|---|---|---|---|---|
| 4,825,354 A | * | 4/1989 | Agrawal et al. ........................ | 1/1 |
| 5,230,047 A | * | 7/1993 | Frey et al. ........................ | 714/4.1 |
| 5,613,082 A | * | 3/1997 | Brewer et al. ........................ | 711/4 |
| 5,950,199 A | * | 9/1999 | Schmuck et al. ........................ | 1/1 |
| 6,021,508 A | | 2/2000 | Schmuck et al. | |
| 6,023,706 A | * | 2/2000 | Schmuck et al. ........................ | 1/1 |
| 6,065,065 A | * | 5/2000 | Murakami et al. ............ | 709/250 |
| 6,848,023 B2 | * | 1/2005 | Teramoto ........................ | 711/127 |
| 7,272,613 B2 | * | 9/2007 | Sim et al. ........................ | 709/223 |

(Continued)

OTHER PUBLICATIONS

Hadoop high availability through metadata replication. Authors: Feng Wang, Jie Qiu, Jie Yang, Bo Dong, Xinhui Li, Ying Li. Proceeding CloudDB '09 Proceedings of the first international workshop on Cloud data management ACM New York, NY, USA ©2009. Nov. 2, 2009. Table of contents ISBN: 978-1-60558-802-5 doi>10.1145/1651263.1651271.*

(Continued)

*Primary Examiner* — Jean B Fleurantin
*Assistant Examiner* — Evan Aspinwall
(74) *Attorney, Agent, or Firm* — Sean M. Evans; Theodore A. Chen; Krishnendu Gupta

(57) ABSTRACT

A treewalk for splitting a file directory is disclosed for parallel execution of work items over a filesystem. The given work item is assigned to a worker. Thereafter, a request is sent to split the file directory to share a portion of the file directory with another worker. The worker examines the file directory for a next splittable directory entry key after a current in-progress location within a key space for the file directory. If no key is detected, the file directory is identified as unsplittable. If an entry is detected, the key space is progressively searched for a next entry between a next available directory entry key and an upper boundary. The worker identifies the file directory as splittable if the next available entry is found, providing a range of entries within the file directory for which parallel execution of the work item.

29 Claims, 9 Drawing Sheets

(56) References Cited

U.S. PATENT DOCUMENTS

| | | | |
|---|---|---|---|
| 7,334,094 B2* | 2/2008 | Fair | 711/161 |
| 7,349,942 B1* | 3/2008 | O'Connell et al. | 709/203 |
| 7,574,461 B1* | 8/2009 | Armorer et al. | 1/1 |
| 7,761,497 B1* | 7/2010 | O'Connell et al. | 709/201 |
| 2003/0126265 A1* | 7/2003 | Aziz et al. | 709/227 |
| 2004/0267838 A1* | 12/2004 | Curran et al. | 707/204 |
| 2005/0102297 A1* | 5/2005 | Lloyd et al. | 707/100 |
| 2005/0198359 A1* | 9/2005 | Basani et al. | 709/232 |
| 2006/0064536 A1 | 3/2006 | Tinker et al. | |
| 2006/0101025 A1* | 5/2006 | Tichy et al. | 707/100 |
| 2006/0117018 A1 | 6/2006 | Christiansen et al. | |
| 2006/0253501 A1* | 11/2006 | Langan et al. | 707/201 |
| 2007/0024919 A1* | 2/2007 | Wong et al. | 358/403 |
| 2007/0143497 A1* | 6/2007 | Kottomtharayil et al. | 709/238 |
| 2008/0313217 A1* | 12/2008 | Dunsmore et al. | 707/102 |
| 2009/0119344 A9* | 5/2009 | Toner | 707/201 |
| 2011/0040810 A1* | 2/2011 | Kaplan et al. | 707/822 |

OTHER PUBLICATIONS

International Search Report and Written Opinion for International Patent Application No. PCT/US2011/024551 mailed Sep. 27, 2011.

\* cited by examiner

PARALLEL FILE SYSTEM PROCESSING

TECHNICAL FIELD

Embodiments relate generally to managing entries in a filesystem, and more particularly, but not exclusively to redistributing the effort to walk a file directory among a plurality of processes.

BACKGROUND

In today's society, it is common to use some form of a computing device to search for, access, and even exchange data with others over wired and/or wireless networks. This data may include different types of structured data, such as audio, video, image, messaging, program, and the like, as well as other types of unstructured data. Consequently, there is a demand for networked file systems that can store large amounts of diverse types of data while also providing relatively fast and reliable access to the stored data.

In response to this demand, various file systems are available to provide access to files that are stored in relatively large data stores. However, just providing access to relatively large networked data stores can be inadequate for many applications. In many instances, providing fast and reliable access over a network to stored data can be as important as the size of the available storage on a data store. Additionally, many applications enable a user to modify at least some of the stored data. While some modifications of data might include changes that affect only a small amount of the stored data, other changes may be global in nature, affecting large quantities of related data that are stored in different data stores. Also, a user might wish to move large amounts of data from one location on a data store to another location on the same or a different data store.

Also, some applications employ data backup mechanisms that require fast and reliable access to relatively large amounts of data in remotely located data stores. These back up mechanisms may employ mirroring, replication, or the like, which are typically used to copy large amounts of data to multiple data stores at different locations. Therefore, it is with respect to these considerations and others that the invention was made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
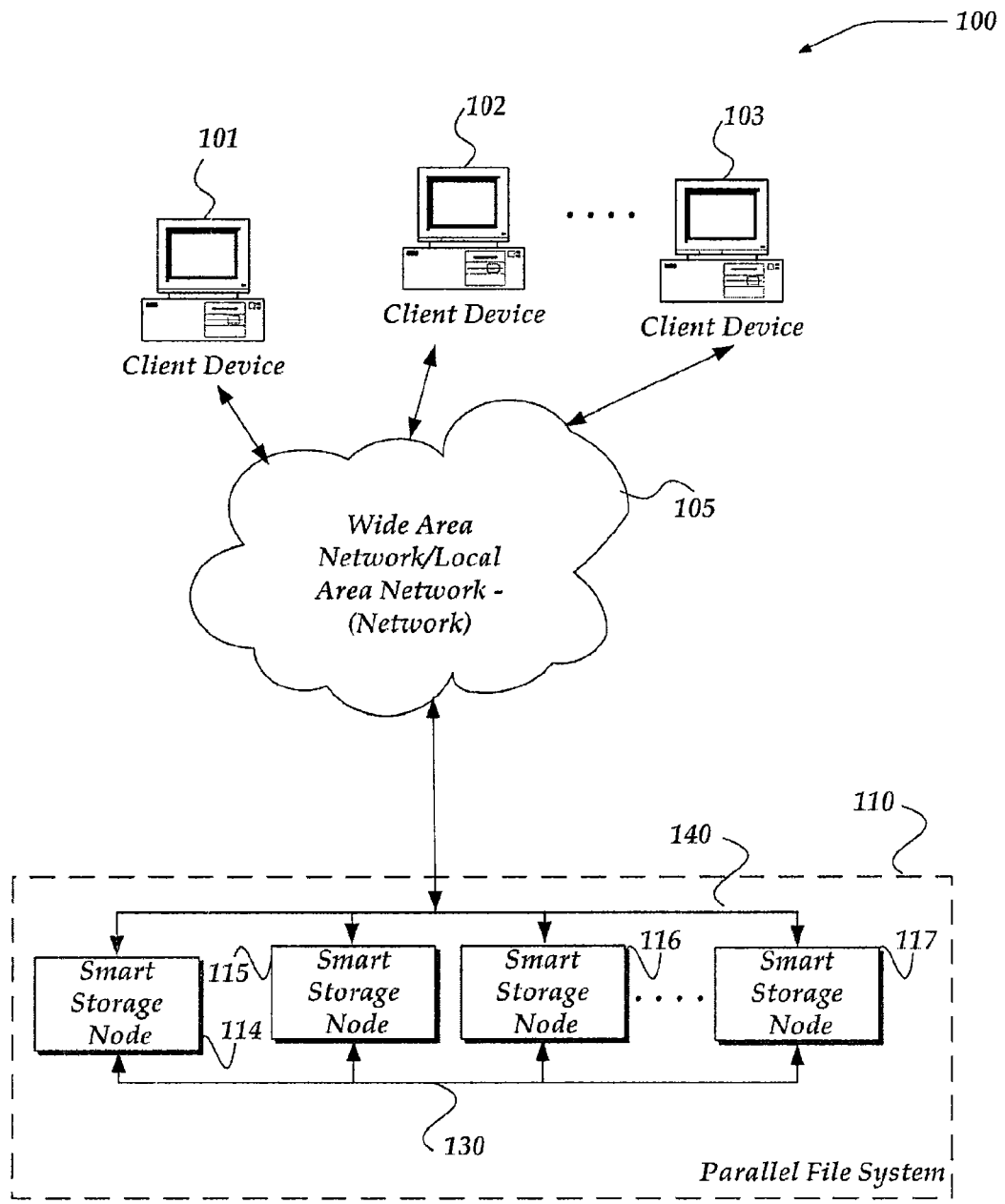
FIG. 1 is a system diagram of one embodiment of an environment in which embodiments of the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "cluster" refers to multiple loosely coupled network devices that cooperate to provide a client access to a set of services, resources, and the like, over a network. The coupled network devices may be referred to as nodes, or members, in the cluster, and may be employed to increase reliability and/or availability of the access. In one embodiment, the network devices may operate as storage devices. However, the invention is not so constrained, and the members may be configured to perform other functions, in other embodiments.

As used herein, the term "filesystem" (sometimes spelled "file system") refers to a computing system and structure for storing and organizing computer directories, files, and data. File names are typically used by a filesystem to manage storage locations in a computer-readable storage medium for a file. Filesystems also employ directories and subdirectories that further associate file names with files by connecting the file name to an index in a file allocation table, or similar structure. A filesystem may further include records that reference a variable length store of related data, a key, and optionally other metadata, including, for example, owner identifiers, group identifiers, access permission settings, and the like. Keys enable the filesystem to locate and identify types of data, including whether the data represents a file, a directory, subdirectory, or the like. In one embodiment, a key may be implemented as a key value pair providing a pointer to an entry in the filesystem. Keys may be organized into a key space, which may be implemented, in one embodiment, as a hash table of the key value pairs, or a base data offset of a file name for which the key is associated. In one embodiment, a key space may be associated with a file directory, such that a directory key space may provide structure, location, and other identifying information to content associated with a given directory. However, in another embodiment, a key space may be associated with an entire filesystem, or slices of a filesystem.

As noted, a filesystem may organize its files using a structure called a file directory structure, file directory, or simply, a directory. For example, a given file directory may organize files within a hierarchical structure that includes a top level directory with zero or more subdirectories. Each directory (including subdirectories) may include zero or more files, and zero or more subdirectories. The files may represent various data, including, but not limited to structured and/or unstructured data. Structured data may include, for example, data stored in a fielded form, such as in databases or annotated (semantically tagged) in documents. Unstructured data may include, for example, HTML data, audio data, video data, image data, computer program data, email, text files, word processing documents, streamlining data, and the like.

File directories may be organized using a balanced or an unbalanced hierarchical structure. Balanced structures typically refer to those file directories that include approximately a same number or size of files and/or subdirectories within each branch of the hierarchy. That is, for a given directory that includes subdirectories, each subdirectory includes about the same number (or size) of files and/or subdirectories as every other subdirectory. A complete binary tree structure is one non-limiting example of a balanced file directory structure.

Unbalanced structures of file directories typically refer to those file directories where there is a disparate number or size of files, and/or subdirectories, within branches of the hierarchy of file directories. Often because of how a typical user might arrange and manage their data within a file directory, a large number of file directories are unbalanced. The filesystem tree walk useable for work redistribution that is described herein, however, is designed to operate over balanced structures as well as unbalanced structures.

Movement through a file directory may be managed through use of a pointer, such as an iterator, a cursor, or the like that identifies a location or a position within a key space. The location may be identified through a pointer to a key space entry. A directory entry (or simply entry) refers to a key space entry that in turn points to a file or a subdirectory entry within a file directory. A subdirectory entry refers to a key space entry indicating that the directory entry is to a subdirectory. A file entry similarly refers to a key space entry indicating that the directory entry is to a file.

Managing work items that are to be performed over content within a file directory may be achieved using the pointer, which identifies a location within the key space (and in turn points to an entry within the file directory).

As used herein, the term "work item" refers to any of one or more actions that are to be performed upon an entry within the filesystem. Work items may include moving an entry from one location within the filesystem to another location within the filesystem (logically and/or physically), modifying an access permission upon the entry, or any of a variety of other actions. While work items may be applied to a single entry, a work item may also be applied to a plurality of entries. For example, a work item might include a request to copy a content of one or more file directories, type of files within a file directory, or the like, from one location to another location (again, logically and/or physically), including, for example, such as might be performed during backup, replication, or mirroring. Similarly, a work item may apply to a directory (or subdirectory). For example, a work item might include changing access permissions to a file directory (which may affect access to content associated—or within—the affected file directory), to entries within a file directory, including subdirectories, or the like.

As used herein, the term "worker" refers to virtually any component configured to perform a work item over a file system. The worker can access a shared recovery state and the file system that is arranged to be walked by one or more workers. In one embodiment, a worker may be implemented as a software process, such as a software program, a thread, or the like. In another embodiment, a worker may be implemented in firmware, hardware components, or the like. And in yet another embodiment, a worker may be implemented in some combination of software and hardware components. A worker may be generated by a "coordinator" (described further below), an operating system, and/or some other software and/or hardware application. Also, once a worker has performed at least some of the work item over at least a portion of the file system, it may be idled, killed, or removed. In at least one embodiment, a worker is associated with just one coordinator.

As used herein, the term "coordinator" refers to virtually any component configured to coordinate the work item activities, including work distribution, and work redistribution performed by workers that are operative to walk the file system. The coordinator can access a shared recovery state and the file system that is arranged to be walked by one or more workers. At least one coordinator is provided to communicate with the one or more workers that are either currently walking the file system, or operative to do so. The coordinator and the one or more workers typically employ a relatively low bandwidth mode of communication. Also, the coordinator can determine whether a worker is active and/or responding, or otherwise disconnected from communicating with the coordinator. In one embodiment, such a determination may be performed using a ping mechanism, a keep alive mechanism, or any of a variety of other mechanisms. Additionally, in one embodiment, a coordinator may be implemented as a software process, such as a software program, a thread, or the like. In another embodiment, a coordinator may be implemented in firmware, hardware components, or the like. And in yet another embodiment, a coordinator may be implemented in some combination of software and hardware components.

As used herein, the term "parallel execution" refers to where many computer calculations are executing simultaneously, or concurrently, and potentially such executions interacting with each other. For example, a given work item may be performed using parallel execution by a plurality of workers over different slices or portions of a file directory (or even over unrelated file directories) The workers may potentially interact with each other, or another entity, such as coordinator.

For the purposes of illustration, some embodiments are described in the context of Internet content-delivery and/or web hosting. However, the invention is not limited by the type of environment in which embodiments may be used, and that the embodiments may be used in other environments, such as, for example, the Internet, the World Wide Web, a private network for a business, a broadcast network for a government agency, an internal network of a corporate enterprise, an intranet, a local area network, a wide area network, and so forth.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards managing parallel execution of work items performed over content within a filesystem by splitting a file directory within the filesystem using a treewalk mechanism. A given work item to be performed over the file directory is initially assigned to a worker in a plurality of available workers. At some time thereafter, a request is sent to the worker to attempt to split the file directory to share at least a portion (or slice) of the file directory with another worker. The worker walks a tree of the file directory to determine if there is a next splittable directory entry key after a current in-progress location within a key space for the file directory. If no key is detected, then the worker identifies the file directory as unsplittable. If an entry is detected, then the key space for the file directory may be progressively searched for a next entry between a next available directory entry key and an upper boundary for the key space. The search may be terminated if a next available entry is found. The worker then identifies that the file directory is splittable, returning, in one embodiment, a range of key space entries for the file directory (e.g., a file directory slice) for which parallel execution of the work item may be performed by the other worker.

As described herein, by offloading onto workers a work item generation based on a split determination, the overall cost for work generation may be parallelized to maximize throughput of total work. Moreover, as disclosed, work item generation may be performed with an incomplete knowledge of a work item scope and any imbalance in work item size may be seen as negligible, since further available workers may effectively split larger work items as they run for a longer duration.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes client devices 101-103, local area networks ("LANs")/wide area networks ("WANs") (herein also "network") 105, and parallel filesystem 110. Parallel filesystem 110 includes smart storage nodes 114-117. As shown, client devices 101-103 communicate with various smart storage nodes 114-117 through network 105. Moreover, each of smart storage nodes 114-117 may communicate with each other over a reserved or separate communications link 130, or even over a common communications link 140. As the dashes within parallel filesystem 110 indicate, there may be more (or less) smart storage nodes than those illustrated.

Generally, client devices 101-103 may include virtually any computing device capable of receiving and sending a message over a network, such as wireless network, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client devices 101-103 may also include virtually any computing device that typically connects using a wired communications medium such as personal computers, multiprocessor systems, microprocessor-based or programmable consumer electronics, network PCs, or the like. In one embodiment, one or more of client devices 101-103 may also be configured to operate over a wired and/or a wireless network.

Client devices 101-103 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-103 also may include at least one other client application that is configured to provide, access and/or request a modification of content from another computing device, such as smart storage nodes 114-117. The client application may include a capability to provide and receive textual content, multimedia information, or the like. The client application may further provide information that identifies itself, including a type, capability, name, or the like. In one embodiment, client devices 101-103 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Network 105 is configured to couple client devices 101-103 with parallel filesystem 110. Network 105 may include any of a variety of wireless sub-networks that may further overlay stand-alone ad-hoc networks, or the like, to provide an infrastructure-oriented connection for client devices 101-103. Such sub-networks may include mesh networks, Wireless LAN (WLAN) networks, cellular networks, or the like.

Network 105 may further include an autonomous system of terminals, gateways, routers, or the like connected by wireless radio links, or the like. These connectors may be configured to move freely and randomly and organize themselves arbitrarily, such that the topology of network 105 may change rapidly.

Network 105 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 101-103 with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like.

Network 105 is further enabled to employ any form of computer readable transport media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router, acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Parallel filesystem 110 represents one embodiment that may be employed for providing and managing data storage. It should be recognized that other configurations might also be employed. However, as disclosed, parallel filesystem 110 may be configured to enable distributed and intelligent data management across each of smart storage nodes 114-117 operating as peers within a cluster to create a single, shared pool of storage for a filesystem. As such, parallel filesystem 110 provides cluster-aware symmetric multiprocessing capabilities that enable various work items to be redistributed between smart storage nodes 114-117, and thereby provide workload balancing.

One embodiment of a network device usable as one of smart storage nodes 114-117 is described in more detail below in conjunction with FIG. 2. Briefly, however, smart storage nodes 114-117 are network devices that provide management of data stored thereon. In one embodiment, smart storage nodes 114-117 may provide placement of files directly on storage mediums within and thereby improve a performance of a disk subsystem by optimally distributing files across the cluster of smart storage nodes 114-117.

Smart storage nodes 114-117 may operate as peers within parallel filesystem 110. As such, a request to perform a work item received, for example, from one or more of clients 101-103 (or from a process within one of smart storage nodes 114-117), may be handled by any one of smart storage nodes 114-117. Smart storage nodes 114-117 may employ intra-cluster communications and/or synchronization over communication links 130 and/or 140 to perform a work item, maintain status, move slices of a file directory, and/or for the identification of possible disconnects of workers, or other entities. Use of communication links 130 and 140 further enable smart storage nodes 114-117 to provide a single virtual filesystem.

In one embodiment, smart storage nodes 114-117 are configured as a plug-and-play, high-density, rack-mountable appliance device that is optimized for high-throughput data delivery. In one embodiment, each of smart storage nodes 114-117 may provide its own data storage medium. Thus, as more storage space is needed or where one or more of smart storage nodes 114-117 fail, additional smart storage nodes may be installed using various mechanisms that do not require the entire parallel filesystem 110 to be taken down, or otherwise cause an interruption of service. However, smart storage nodes 114-117 are not constrained to rack-mountable appliance devices, and other configurations may also be employed. For example, in one embodiment, smart storage nodes 114-117 may be replaced by a plurality of network devices that access data storage concurrently from a remote storage device that is accessible by more than one of the plurality of network devices, in parallel (or concurrently).

In one embodiment, each of smart storage nodes 114-117 may be configured substantially the same. However, the invention is not so limited. Thus, in another embodiment, for example, at least one of smart storage nodes 114-117 may be configured with a different type and/or amount of available computer-readable storage space.

Smart storage nodes 114-117, and thereby parallel filesystem 110, may be configured to support a hot, standby smart storage node. The hot standby device may operate, in one embodiment, as an idle storage node that might not currently handling data storage. However, the hot standby device may be placed into use at any time one of the other active smart storage nodes fails. In one embodiment, the hot standby device may be aware of various transactions by other smart storage nodes such that there may be minimal time and/or data at risk during the failure recovery.

FIG. 1 illustrates that client devices 101-103 may communicate 'directly' with a given smart storage node 114-117 within parallel filesystem 110. Such communications, in one embodiment, may be performed through various mechanisms, including use of a load balancing mechanism to select and/or direct client requests to a particular smart storage node. While client devices may communicate directly with a give smart storage node in FIG. 1, other embodiments are also envisaged. For example, in another embodiment, a network device, operable as a server device, might be interposed between client devices 101-103, and parallel filesystem 110. In this embodiment, client devices might communicate with the interposed server device, which in turn may load balance requests for data, requests to perform a work item, or the like, across smart storage nodes 114-117. Thus, system 100 of FIG. 1 is not to be construed as limiting the invention, and instead merely provides one of numerous other possible environments in which the invention may operate.

Illustrative Network Device Operable As a Node within a Cluster

Figure 2:
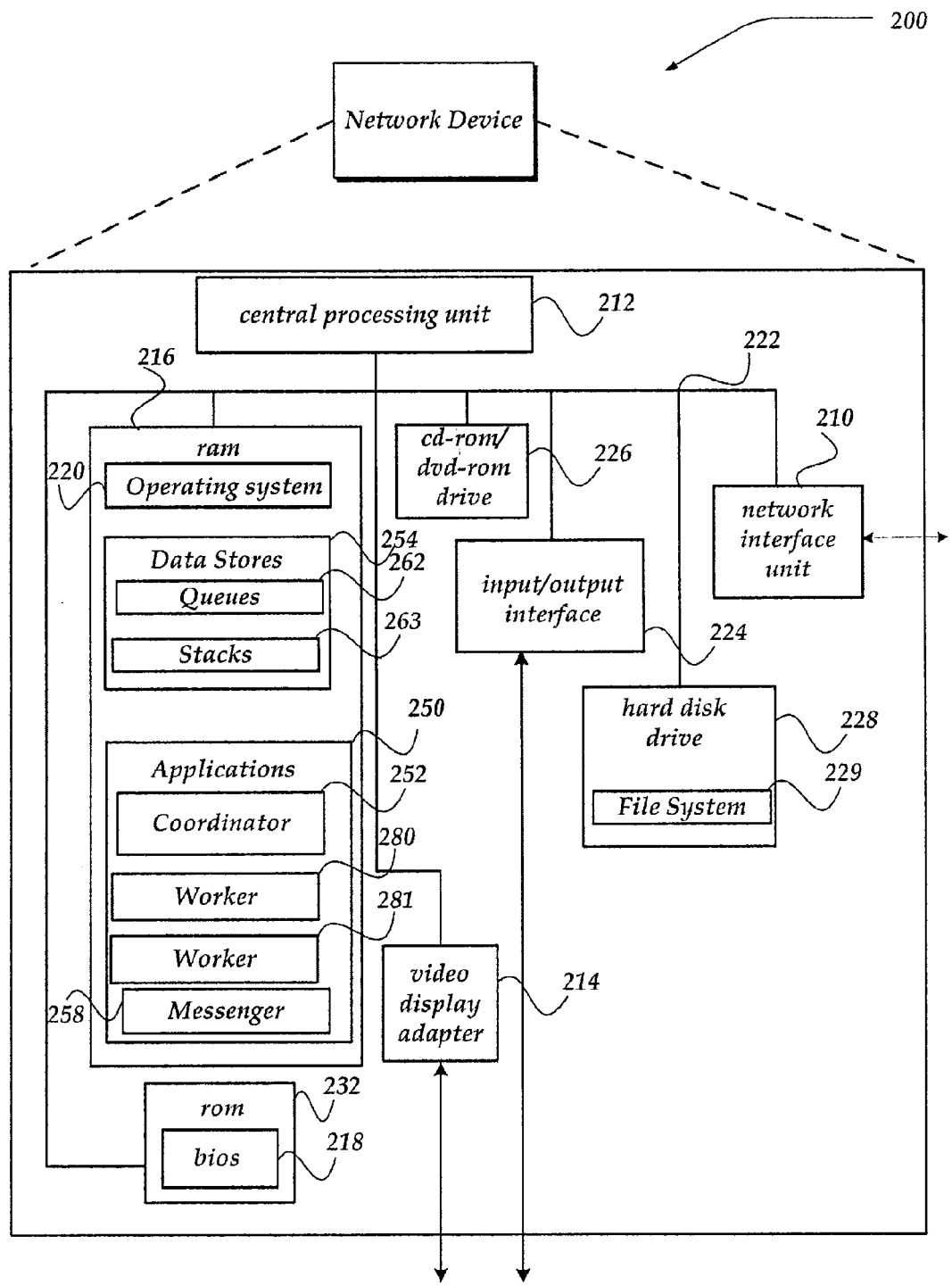
FIG. 2 shows one embodiment of a network device useable as a smart storage node in a system implementing various embodiments.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, any one or more of smart storage nodes 114-117 of FIG. 1.

Network device 200 includes one or more central processing units 212 (processors), video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. In one embodiment, virtually any general-purpose operating system may be employed. However, in other embodiment, operating system 220 might be a special purpose operating system that provides, for example, a single intelligent mechanism to manage a filesystem that spans a plurality of nodes with a cluster. One non-limiting example of a special purpose operating system is OneFS® by Isilon Systems, Inc., of Seattle Wash.

Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer readable storage media. It should be further recognized that computer-readable storage media might also be known as processor-readable storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical storage medium which can be used to store the desired information and which can be accessed by a computing device.

The mass memory also stores program code and data. For example, mass memory might include data stores 254. Data stores 254 may be include virtually any mechanism usable for storing and managing data, including but not limited to a file, a folder, a document, or an application, such as a database, spreadsheet, or the like. Data stores 254 may manage information that might include, but is not limited to queues 262, stacks 263, and the like. Queues 262 may include virtually structure usable to receive and store information about a state of workers 280-281, as well as workers that may reside within another network device similar to network device 200. In one embodiment, such queues may be include an OFFLINE queue, an IDLE queue, a SPLITTABLE queue, a SPLIT_PENDING queue, and a RECOVERY queue, each of which are described in more detail below in conjunction with FIGS. 5-9.

Stacks 263 represent tables, spreadsheets, lists, or the like that are useable to store content that may be order related. In one embodiment, stacks 263 represent a data structure that is configured to organize data. In one embodiment, data within the stack may be accessed using a last in/first out approach. However, in another embodiment, data within the stack may be accessed using a pointer such as an iterator, a cursor, or the like, to items within the stack. In one embodiment, a key space representing entries within a file directory may be structured using one of stacks 263. In one embodiment, a stack of key space entries or key value pairs may be organized based on a numeric value of the key value pairs. For example, the key value pairs may be organized such that numerically higher key value pairs might be higher on the stack than key value pairs having a numerically lower value. In one embodiment, a stack might also be viewed in a horizontal perspective such that key value pairs may be sorted based on their numeric value. In one embodiment, as discussed below in conjunction with FIG. 4, a stack of key value pairs may be sorted such that those numerically lower key value pairs are to a left of numerically higher valued key value pairs. That is the sort order may be lower to higher values as the stack is read from left to right. However, the invention is not so constrained, and the sort order of key value pairs within one of stacks 263 may also be higher values to lower values as the stack is read from right to left.

In any event, data stores 254 may also include scripts, applications, applets, and the like. At least some of the information in data stores 254 may also reside on hard disk drive 228, cd-rom/dvd-rom drive 226, or other computer readable storage medium.

As shown, filesystem 229 is illustrated as residing within hard disk drive 228. However, filesystem 229 may also reside within cd-rom/dvd-rom 226, or in another network device. In one embodiment, filesystem 229 may represent virtually any filesystem, including, but not limited to a distributed file system, a mirrored file system, a network file system, a shared disk file system, a clustered file system, or the like. In one embodiment, filesystem 229 may be a high-performance shared-disk clustered file system. Moreover, while filesystem 229 is illustrated within network device 200, in one embodiment, only a portion of filesystem 229 might reside within network device 200. Filesystem 229 might also be distributed across or even simultaneously mounted on a plurality of network devices, such as described below in conjunction with FIG. 3. In another embodiment, filesystem 229 might be mirrored using various techniques across a plurality of network devices.

In one embodiment, network device 200 might manage filesystem 229 across the plurality of network devices using a variety of communication protocols, including, but not limited to Network File System (NFS), Common Internet File System (CIFS), or the like.

One or more applications 250 may be loaded into mass memory and run on operating system 220. Examples of application programs may include transcoders, schedulers, calendars, database programs, word processing programs, HTTP programs, customizable user interface programs, IPSec applications, encryption programs, security programs, VPN programs, web servers, account management, mirroring services, and so forth. Applications 250 may include coordinator 252, workers 280-281, and messenger 258. It should be noted that while network device 200 shows two workers, the invention is not so limited, and zero or more workers might reside in a given network device. Similarly, zero or one coordinator 252 might reside in a given network device. However, one of network devices, representing a plurality of smart storage nodes 114-117 of FIG. 1, will include a coordinator, while other network devices within the plurality might not include a coordinator. A non-limiting arrangement of workers and coordinator are described in more detail below in conjunction with FIG. 3.

Messenger 258 may include virtually any computing component or components configured and arranged to forward messages between coordinator 252, workers 280-281, and other workers residing on another network device. Messenger 258 may include a message transfer manager to communicate a message employing any of a variety of messaging protocols. In one embodiment, messenger 258 might employ a reserved communications link between network devices, such as smart storage nodes 114-117 of FIG. 1. However, messenger 258 is not limited to any particular communications link, and may use virtually any mechanism that enables the various smart storage nodes 114-117 of FIG. 1 to communicate.

Workers 280-281 represent virtually any component configured to perform a work item over a file system, such as filesystem 229. For example, workers 280-281 may be implemented as a software process, such as a software program, thread, or the like. In another embodiment, workers 280-281 might be implemented in firmware, hardware components, or the like. In one embodiment, workers 280-281 might be generated by coordinator 252, operating system 220, or another application, employed to perform at least some of the work item over at least a portion of filesystem 229, and then be idled, killed, or removed from network device 200.

Coordinator 252 represents virtually any component configured to coordinate the work item activities, including work distribution, and work redistribution performed by workers 280-281, and zero or more workers on one or more other network devices. Thus, coordinator 252 may be implemented as a software process, such as a software program, thread, or the like. In another embodiment, coordinator 252 might be implemented in firmware, hardware components, or the like. In one embodiment, coordinator 252 may communicate with a plurality of workers, including workers 280-281, to determine whether a worker is active and/or responding, or otherwise disconnected from communicating with coordinator 252. In one embodiment, such determination may be performed using a ping mechanism, a keep alive mechanism, or any of a variety of other mechanisms.

In one embodiment, coordinator 252 may employ the various queues to manage the plurality of workers. For example, coordinator 252 may place an identifier, or the like, associated with a given worker within a given queue, move the identifier from one queue to another, or delete the identifier for a given worker from any queue. For example, as described further below, coordinator 252 may place an identifier of each active and communicating worker initially within the IDLE queue, and then as a worker is assigned work, might move the worker to within the SPLITTABLE queue.

Coordinator 252 might receive a request to have a work item performed over at least a portion of filesystem 229. The request might be received directly from an external network device, such as a client device, a remote server device, or the like. In one embodiment, the work item might be received through operating system 220, or even another application executing within network device 200, or a similar other network device. In one embodiment, coordinator 252 might receive several work items and bundle the work items together into a new work item. Similarly, coordinator 252 might unbundle a given work item into smaller work items to be assigned to various workers 280-281, or the like. It should be noted, however, that the bundling and/or unbundling of work items may also be performed by operating system 220, and/or another application. In any event, coordinator 252 may send a request to one or more of workers 280-281 (or another worker on another network device) to perform a work item on entries within a file directory (or slice thereof) within filesystem 229.

Coordinator 252 may further send a request to split the file directory (or slice of file directory) over which a given worker is performing the work item. Coordinator 252 may receive information from the given worker indicating whether the file directory is splittable or not. If the worker indicates that the file directory is splittable, the worker may provide information about at least a portion or slice of the file directory that may be split from the file directory and given to another worker to perform the work item over. Coordinator 252 may manage work items using, for example, processes described below in conjunction with FIGS. 5-8. Moreover, workers 280-281 may employ a treewalk process such as described below in conjunction with FIG. 9 to determine whether a file directory is splittable.

Non-Limiting Architecture for Workers

Figure 3:
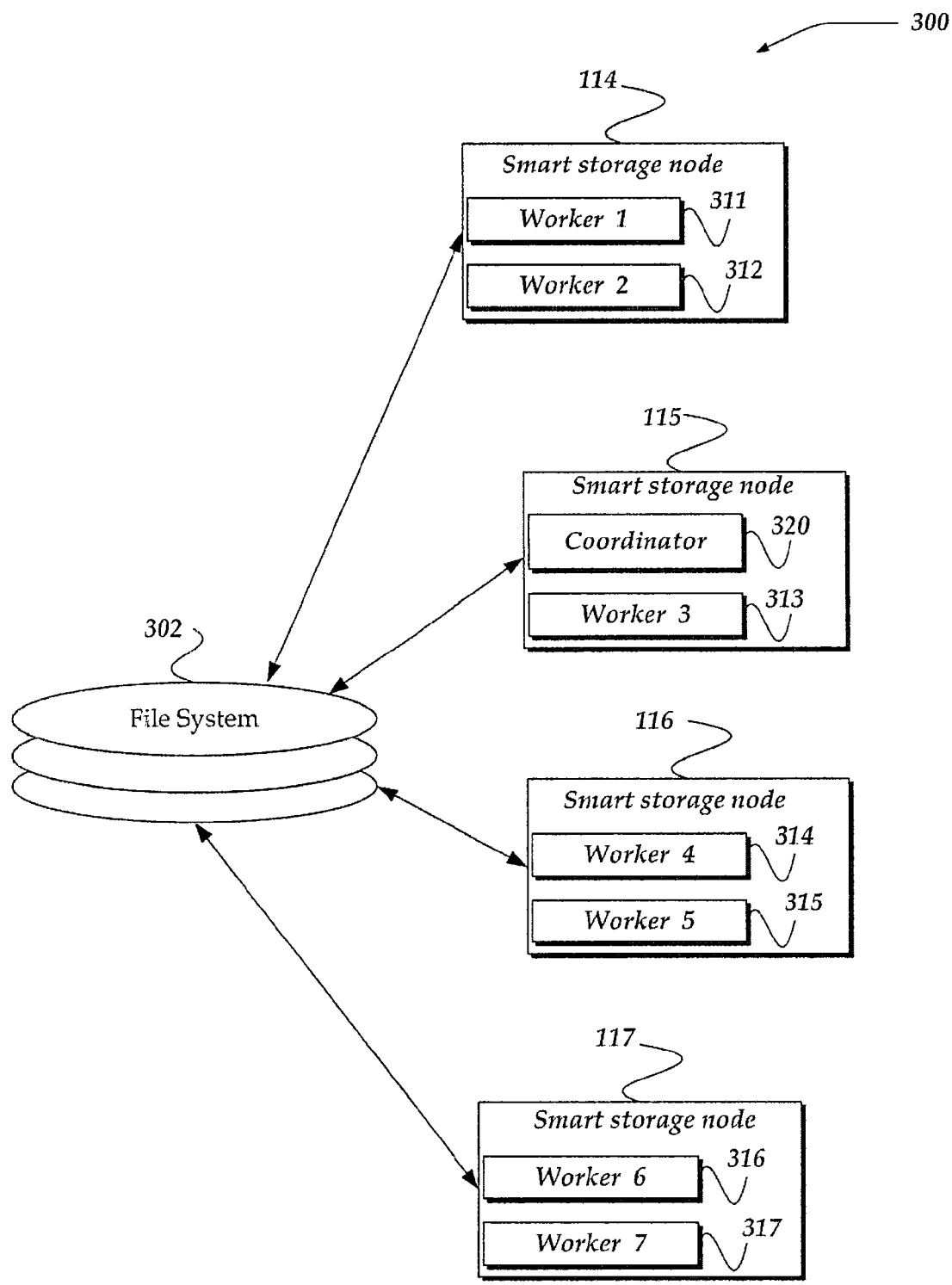
FIG. 3 shows one embodiment of various components useable within the invention.

FIG. 3 shows one embodiment of various components discussed above. Architecture 300 of FIG. 3 may include many more or less components than those shown. The components shown, however, are sufficient to disclose an illustrative architecture for practicing various embodiments. Many of the components shown in FIG. 3 have been described above in conjunction with FIGS. 1-2.

Thus, architecture 300 shows smart storage nodes 114-117, and filesystem 302. Workers and a coordinator, such as those described above, are distributed across one or more the smart storage nodes 114-117. For example, as illustrated, workers 311-312 are illustrated within smart storage node 114, worker 313 is within smart storage node 115, workers 314-415 are within smart storage node 116, and workers 316-317 are illustrated within smart storage node 117. Further, coordinator 320 is shown within smart storage node 115. It should be noted, however, that a given smart storage node may include more or less workers than illustrated. Further, a given smart storage node might include more or less workers than another smart storage node. Thus, the invention should not be limited to a particular organization of workers and coordinators, and other arrangements may also be employed. For example, when a worker fails, a replacement worker need not be started in a same smart storage node as that in which the worker failed.

Filesystem 302 represents virtually any filesystem structure usable to store and otherwise organize computer files and other data. In one embodiment, the filesystem is distributed across or simultaneously mounted on, as described above, each of smart storage nodes 114-117. Thus, in one embodiment, although filesystem 302 is illustrated outside of smart storage nodes 114-117, portions of filesystem 302 may actually reside physically distributed across smart storage nodes 114-117. In one embodiment, by distributing filesystem 302 across the smart storage nodes 114-117 allows each node to manage the data within as a coherent peer to another node. If any of smart storage nodes 114-117 fails, data within filesystem 302 is still accessible through another node. Moreover, filesystem 302 is configured to enable concurrent access at least by multiple workers, such as workers 311-317. One non-limiting example of a distributed or parallel filesystem usable as filesystem 302 is described in more detail in U.S. Pat. No. 7/509,524, entitled "Systems and Methods For A Distributed File System With Data Recovery," which issued on Mar. 24, 2009, assigned to Isilon Systems, Inc. of Seattle Wash., and is incorporated in its entirety herein. However, other implementations of filesystem 302 are also envisaged.

In one embodiment, filesystem 302 may include data organized using a directory tree structure, where files may be associated with a given directory, and wherein zero or more directories, called subdirectories, may be organized under a top level directory. One non-limiting embodiment of a directory tree structure with a key space is described in more detail below in conjunction with FIG. 4.

Non-Limiting Key Directory Structure

Figure 4:
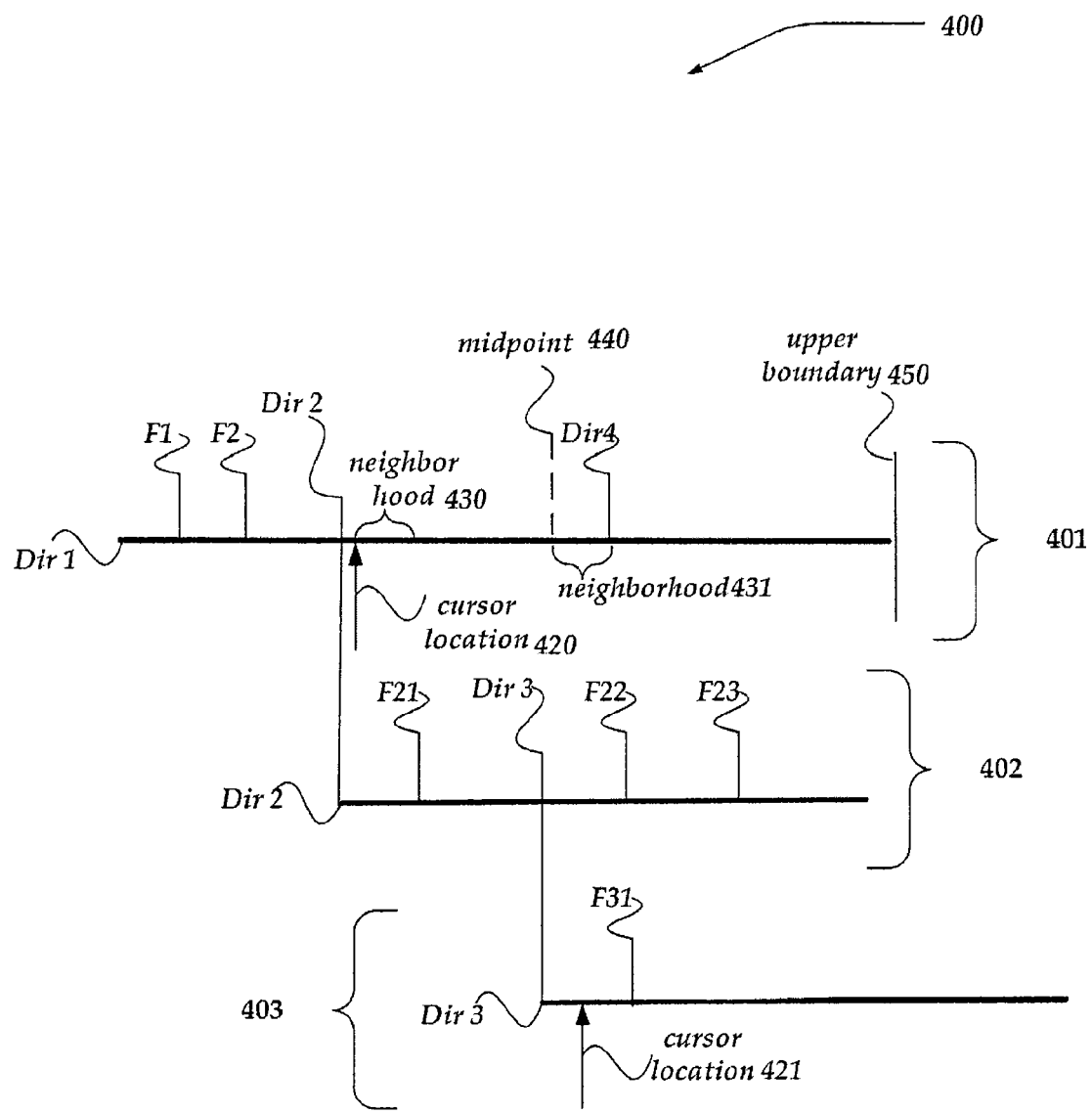
FIG. 4 illustrates a non-limiting example of a directory structure.

FIG. 4 illustrates a non-limiting example of a key space for a directory structure for describing various terms used herein. It should be noted that structure 400 of FIG. 4 is merely an example, and is not intended to be exhaustive, or complete. Thus, structure 400 may include more or less elements than those shown. However, the elements shown are sufficient to disclose an illustrative example of a key space for a directory structure.

As shown, structure 400 illustrates three directories, Dir 1, Dir 2, and Dir 3. The top level directory (TLD) is named Dir 1, and includes subdirectories Dir 2 and Dir 4. Dir 4 is not fully illustrated, for simplicity. Subdirectory Dir 2 includes subdirectory Dir 3.

Further illustrated, top level directory includes files F1 and F2. Subdirectory Dir 2 includes files F21, F22, and F23, while subdirectory Dir 3 includes file F31. As illustrated, structure 400 is a non-limiting example of an unbalanced directory tree structure.

While structure 400 illustrates a directory structure, structure 400 may also be used to represent a key space for the above-described directories. In one embodiment then, structure 401 may represent a key space for the top level directory Dir 1. Similarly, structures 402 and 403 may represent key spaces for subdirectories Dir 2 and Dir 3, respectively.

In one embodiment, the key space structures 401-403 may be structured such that the key entries are arranged in a key value ascending order. Thus, a key value for file F1 might be determined to have a numerically lower or smaller value than, for example, the key value for file F2, or Dir 2. As illustrated, based on a key value ascending order, the key value for file F1 is lower, below, or less than, for example, the key value for file F2, Dir 2, Dir 4, or the like.

Each entry within a given key space represents a key value pair for a directory entry, whether the directory entry represents a subdirectory, such as Dir 2 and Dir 4 shown in structure 401, or a file key entry such as for files F1 and F2. Thus, in one embodiment, F1, F2, Dir 2, Dir 4 shown within structure 401 represent key value pairs.

As noted above, a key value pair may be implemented as a base data offset of a directory for a file entry, or a name key hash for a subdirectory entry. However, other implementations are also usable, and the invention is not to be constrained to a particular key entry implementation. In one embodiment, however, from an examination of a key value pair, and/or related metadata (not shown), it can be determined whether the key entry is associated with a directory (or subdirectory), or a file. The related metadata may also provide other information, including, but not limited to, an ownership of the file (or directory), a size of the file (or directory), a location of the file (or directory) associated with the key entry, file permissions for the file (or directory), as well as other information.

Also illustrated in structure 400 are cursor locations 420-421, neighborhoods 430-431, midpoint 440, and upper boundary 450. Such elements may be employed during the treewalk of a directory to determine whether the directory or portion thereof is splittable. Cursor locations 420-421 represent pointers, or the like, that indicate a location within a given key space for a directory typically after a last directory entry within the key space that the worker is processing or upon which the worker is performing a work item. Thus, for example, as illustrated, cursor location 420 illustrates that the worker is operating on or within Dir 2 (the entries of directory Dir 2). In this example, cursor location 421 further indicates that the worker is within subdirectory Dir 3, but has not yet started work on directory key entry F31 (which is associated with the file F31).

Midpoint 440 is a location within a given structured key space that is determined to be about halfway between the cursor location 430 and the upper boundary 450. The upper boundary 450 initially represents a highest key value for a given directory structure. However, as is described in more detail below in conjunction with FIG. 9, the upper boundary 450 may be recomputed and reset to another value during a treewalk.

Neighborhoods 430-431 represent a pre-defined key value for which to perform a look ahead into a given key space. In one embodiment, the value of the neighborhoods 430-431 may be determined as a key value to be added to the value of the cursor location. In one embodiment, the size of neighborhoods 430-431 may be the same. However, in another embodiment, the size of neighborhoods 430-431 may differ. In any event, the range of key values defined between the cursor location and the end value for the neighborhood may then be examined to determine whether a directory entry is located. As illustrated, for neighborhood 430, no directory entry (file entry or subdirectory entry) is located. However, for neighborhood 431, a directory entry is located (a subdirectory entry for Dir 4).

Generalized Operation

The operation of certain aspects of the invention will now be described with respect to FIGS. 5-9. Briefly, the following describes processes usable by a coordinator to manage work distribution over a plurality of available workers. As discussed above, the coordinator maintains several queues for tracking a state of each worker within the plurality of workers. In one embodiment, the queues are an OFFLINE queue, an IDLE queue, a SPLITTABLE queue, a SPLIT_PENDING queue, and a RECOVERY queue.

The OFFLINE queue is configured to initially include each of the plurality of workers. As workers communicate (or connect) with the coordinator, and request work, they are moved off of OFFLINE queue. Any worker that disconnects unexpectedly with the coordinator is moved to the OFFLINE queue until the connection is restored. In one embodiment, a connection between the coordinator and workers may be monitored using various signals, messages, or the like. For example, in one embodiment, keep-alive messages, ping messages, or the like, might be sent by the coordinator, and/or the worker. Failure to receive a keep-alive message within a defined time period from a given worker might be construed as an unexpected disconnect or failure of the given worker (or device in which the worker resides). Similarly, a failure to receive a response from a given worker to a ping message that is sent by the coordinator may also be interpreted as an unexpected disconnect, or failure. It should be recognized, however, that other mechanisms may also be employed to detect a worker disconnect, including receiving information from an operating system, receiving a message from a third entity, such as a different worker, about a given worker, or the like. Similarly, restoration of a previously disconnected worker may be determined based on receiving a message, signal, or the like, from the worker, another worker, the operating system, or some other source for the restored worker.

The IDLE queue includes those workers that have sent a work request to the coordinator and are considered to be waiting for work to be assigned to it from the coordinator. The SPLITTABLE queue includes those workers that are determined by the coordinator to being currently active, and working on a given work item. Such status might be determined through a variety of mechanisms, including receiving periodic messages from the worker that includes status of the worker, receiving a message from the worker based on a request for status sent by the coordinator, or the like.

If a worker has been sent a request to split its work, but has not responded to the request, then the worker is included within the SPLIT_PENDING queue. The RECOVERY queue includes descriptions of work items that were being processed by workers that unexpectedly disconnected from the coordinator. The RECOVERY queue is meant to be a recovery mechanism so that incomplete work items can be recovered and re-assigned to an available worker for completion.

In one embodiment, at any given time, each worker in the plurality of workers is considered to be assigned to only one of the above-described queues. Moreover, in one embodiment, each queue is implemented using a First-In/First-Out (FIFO) scheme. However, other mechanisms for managing the queues may also be employed. Thus, the invention is not constrained to FIFO queues.

In addition, each worker has an associated structure that is managed by the coordinator that includes various state information associated with a given worker. In one embodiment, the state information includes, a last time the worker was sent a split request and a description of the work item (if any) the worker is assigned to process. Such information may be useable, for example, should the worker become disconnected from the coordinator, or otherwise fails.

Figure 5:
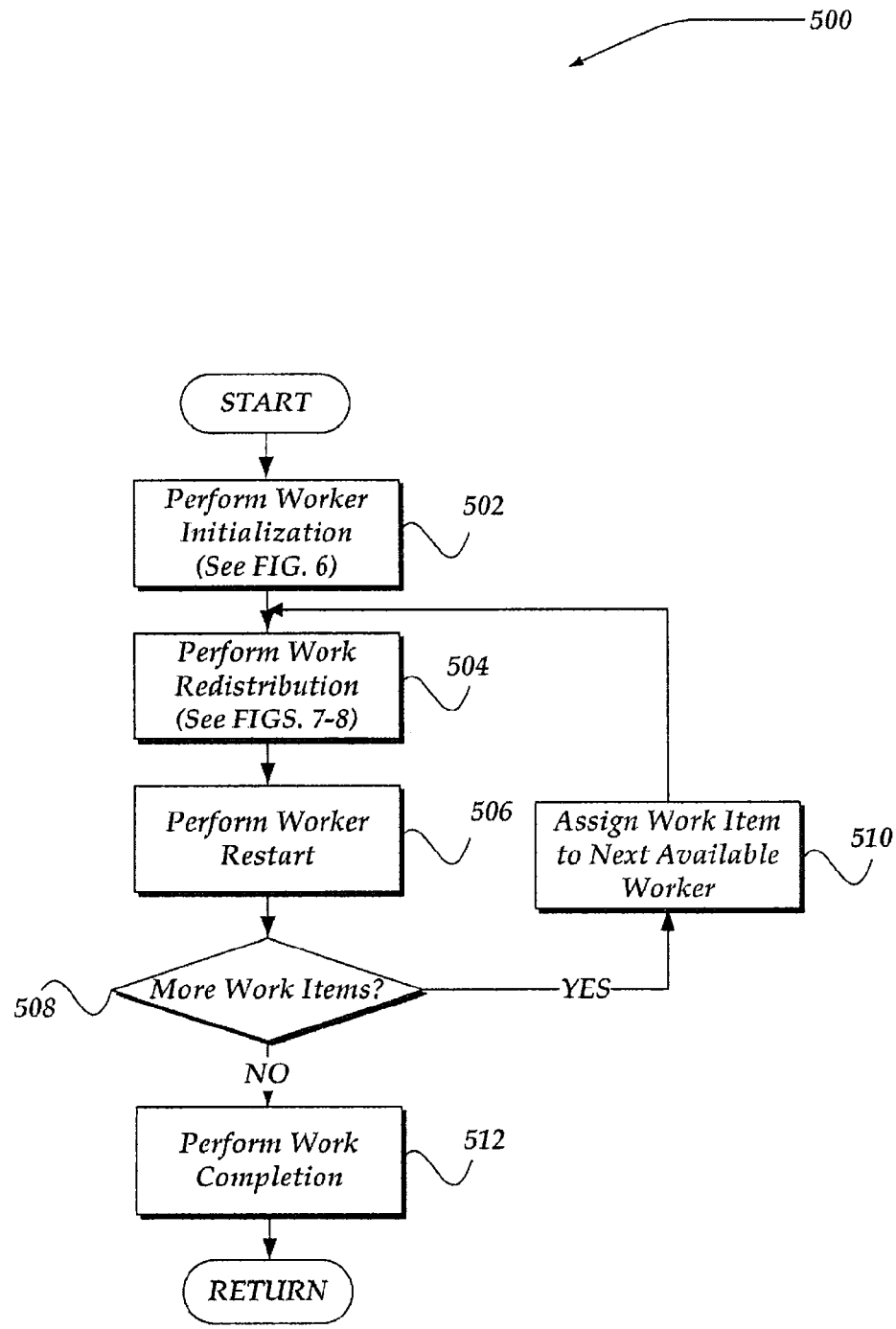
FIG. 5 illustrates a logical flow diagram generally showing one embodiment of a process for use in coordinator work management.

FIG. 5 illustrates a logical flow diagram generally showing one embodiment of an overview process for use by the coordinator to manage work items. Thus, in one embodiment, process 500 of FIG. 5 may be implemented in any of smart storage nodes 114-117 that includes coordinator 252 as described above in conjunction with FIG. 2.

Process 500 begins, after a start block, at block 502, which is described in more detail below in conjunction with FIG. 6. Briefly, however, at block 502, as a work item is received by the coordinator, the coordinator assigns the work item to a worker in one of the OFFLINE or IDLE queues.

Processing then moves to block 504, which is described in more detail below in conjunction with FIGS. 7-8. Briefly, however, in one embodiment of block 504, at defined intervals, the coordinator performs a work redistribution operation that includes sending a request to a worker to split its file directory over which the worker is performing a work item. If the worker receiving the split request indicates that the file directory is splittable, then the coordinator may assign a portion (or slice) of the file directory to another worker. In this manner, the work item may be efficiently redistributed across a plurality of workers to seek to maximize parallel execution of the work item within the file directory.

Continuing to block 506, the coordinator may determine that a worker has disconnected from communication with the coordinator, or otherwise failed. When a worker is assigned an item of work, the coordinator saves information about the work item in the worker's state structure. However, if a worker disconnects from the coordinator unexpectedly, its work item will be re-assigned to another worker—or, in one embodiment, the same worker, after the worker recovers. In any event, when the coordinator detects that the worker is disconnected or otherwise failed, the worker's work item is identified within the RECOVERY queue.

In one embodiment, the RECOVERY queue may be managed as described below in conjunction with FIGS. 7-8. Briefly, however, if there are any work items in the RECOVERY queue, that work item may be sent to a worker in the IDLE queue until either a determined available worker count diminishes below some defined value, or the RECOVERY queue is determined to be empty.

Because a worker may become disconnected or otherwise fail at virtually any time, block 506 may be performed concurrent with, or asynchronous to, block 504. Thus, while process 500 illustrates a sequential flow of operations, the invention is not to be construed as being so limited.

In any event, processing continues to decision block 508, where a determination is made whether there are any more work items that are to be assigned to one or more workers. If no additional work items are received, and each of the workers in the plurality of workers are assigned to the IDLE queue and there are no more work items in the RECOVERY queue, then processing flows to block 512. If there are more work items received, or there are work items in the RECOVERY queue, then processing loops to block 510, where the next work item is assigned to a next available worker from the IDLE queue. The worker is then re-assigned to the SPLITTABLE queue, and processing loops back to block 504, to continue until there are no more work items to be assigned.

At block 512, because there are no more work items to assign to a worker, the coordinator may disconnect communications with each of the plurality of workers, and record various statistics about the work items. Such statistics may include, but are not limited to a description of the work item, success or failure of completion of the work item, a time consumed to complete the work item, an amount of resources, including a number of workers, used to complete the work item, and a number of times the work item was redistributed. Process 500 may then return to a calling process to perform other actions.

Figure 6:
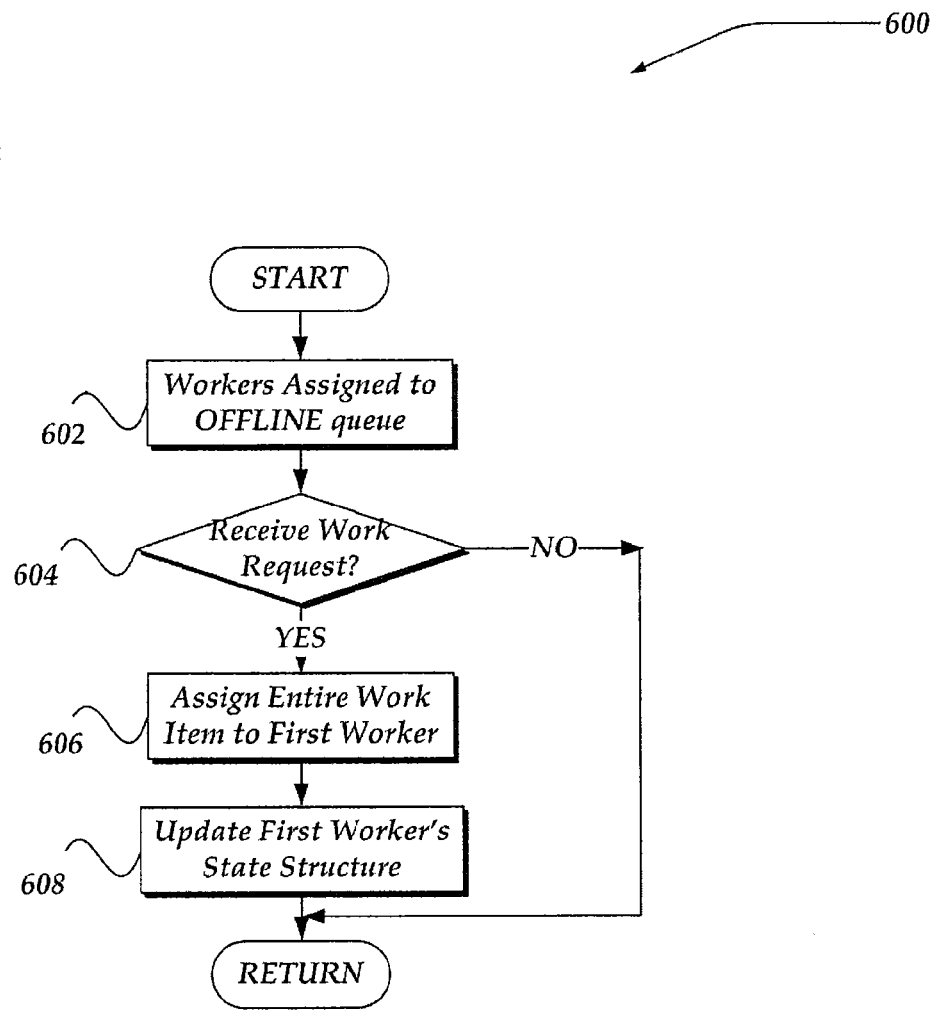
FIG. 6 illustrates a logical flow diagram generally showing one embodiment of a process for worker initialization.

FIG. 6 illustrates a logical flow diagram generally showing one embodiment of a process for worker initialization. As noted above, process 600 of FIG. 6 may represent one embodiment of block 502 of process 500. Thus, process 600 may be performed by the coordinator, such as coordinator 252 of FIG. 2. In any event, process 600 may begin, after a start block, at block 602, where each worker in a plurality of workers may be assigned to the OFFLINE queue.

Processing then flows to decision block 604, where a determination is made whether a work item is received that is to be assigned to one or more workers. In one embodiment, the work item may be received by the coordinator from another process through a work request message. In another embodiment, work items may be identified in a work queue, or other structure. In which instance, the coordinator might monitor the work queue for work items. If no request to perform a work item is received (or the work queue is empty), then processing returns to a calling process to perform other actions; otherwise, processing proceeds to block 606.

At block 606, in one embodiment, the entire work item to be performed over entries within a file directory is assigned to a first worker from the OFFLINE queue. In one embodiment, the work item is provided to the worker through a work response message. However, other signals, messages, flags, or the like, may also be used. In any event, in one embodiment, the worker, upon receiving the work item, may perform at least some of the work item on at least one entry within the file directory. A worker's progress on the work item within the file directory may be identified by a cursor location within a key space for the file directory. That is, in one embodiment, as described above, in conjunction with FIG. 4, a cursor location might be positioned by the worker after an entry within the key space upon which the worker is currently working. In this manner, the cursor location may provide a current in-progress location within a key space for the file directory for the given worker.

Processing continues to block 608, where the worker's state structure is updated to identify the work item assigned. In one embodiment, a time of the assignment may also be included in the state structure, along with other information. The worker is further moved from the OFFLINE queue to the SPLITTABLE queue. Processing then returns to a calling process to perform other actions.

Figure 7:
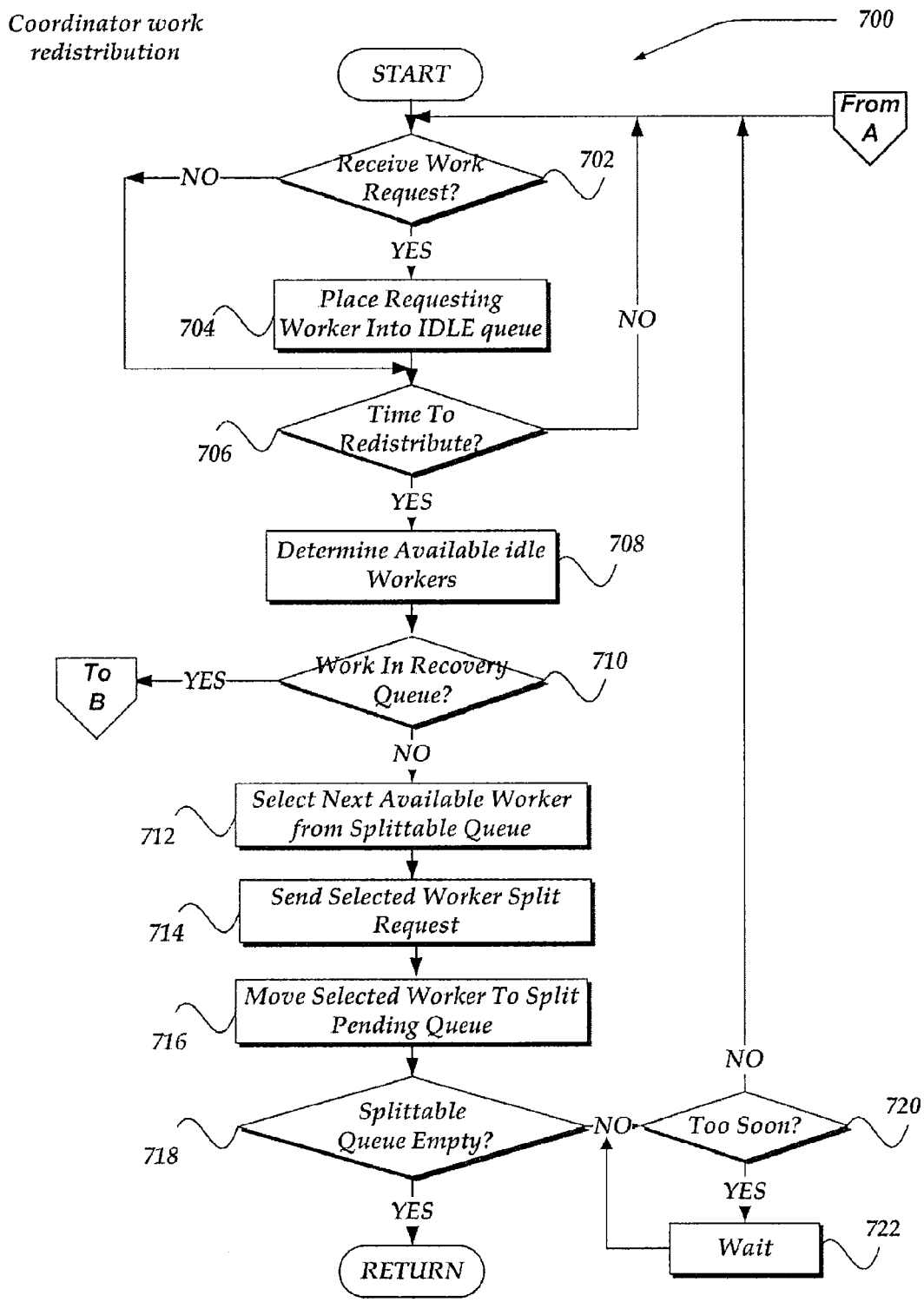
FIG. 7 illustrates a logical flow diagram generally showing one embodiment of a process for coordinator work redistribution.
Figure 8:
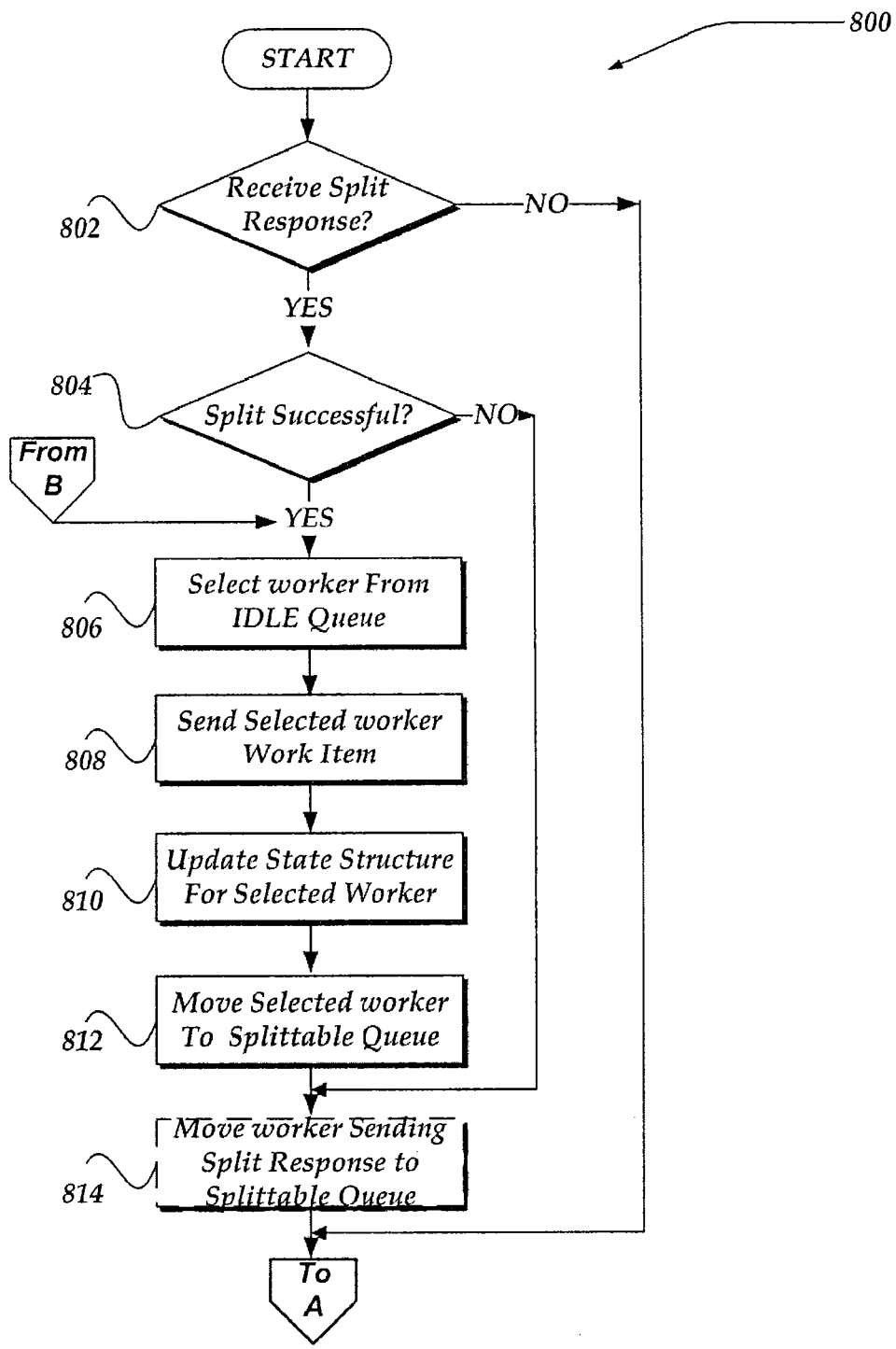
FIG. 8 illustrates a logical flow diagram generally showing one embodiment of managing responses from a worker that has received a split request.

FIG. 7-8 illustrates a logical flow diagram generally showing one embodiment of a process for coordinator work redistribution. As described above, processes 700 and 800 of FIGS. 7 and 8, respectively represent one embodiment of block 504 of process 500.

Process 700 of FIG. 7, begins, after a start block, at decision block 702, where a determination is made whether a work request is received from a worker. Such work requests indicate that a worker is available and seeks to perform a work item. If such a request is received from a worker, processing flows to block 704, where the worker sending the work request is assigned to the IDLE queue. Processing then flows to decision block 706. If no work request is received at decision block 702, however, processing also flows to decision block 706.

At decision block 706, a determination is made whether to perform a work redistribution action. In one embodiment, the determination may be based on an elapse of a set interval of time. Thus, in one embodiment, work redistribution may be performed periodically, or even a periodically. In one embodiment, the determination may be based on other factors, including a quantity of IDLE workers, a size, or type of work item that may be redistributed, or the like. In any event, if work redistribution is not to be performed, processing loops back to decision block 702; otherwise, processing continues to block 708.

At block 708, a determination is made as to a number of available idle workers. In one embodiment, the available workers are determined as the number of workers assigned to the IDLE queue minus a number of workers assigned to the SPLIT_PENDING queue. Accounting for the split pending workers is performed because a split response may consume an idle worker. Thus, idle workers may be "reserved" to address pending splits.

Processing continues next to decision block 710, where a determination is made whether there is any work items in the RECOVERY queue to be assigned. If so, then processing branches to block 806 of process 800, which is described further below in conjunction with FIG. 8. Otherwise, processing continues to block 712 of process 700.

At block 712, a next available worker within the SPLITTABLE queue is selected. In one embodiment, selection of the next available worker may include determining when the worker was last sent a split request. Such determination may be performed, in one embodiment, by examining a last split time stamp, or the like. By performing such examination, requesting the worker to split too often might be avoided.

In one embodiment, however, a worker might seek to have its file directory split more frequently. This might arise, for example, where the file directory is determined to include a large number of a particular type or size of files. Such files might consume a large amount of a single worker's time. However, by having the worker request splits that are more frequent, the file directory, and therefore the work item, might be more efficiently distributed across more workers. In one embodiment, a flag, a message, or other signal, might be used to designate that the worker seeks splits that are more frequent. In one embodiment, the last split time stamp might also be 're-set,' to enable the worker seeking more frequent splitting, to receive a split request more often.

Processing next flows to block 714, where if the next worker is available in the SPLITTABLE queue, a split request may be sent to the selected available worker requesting that the worker attempt to split the file directory to share at least a portion of the file directory with another worker for performing the work item.

Processing continues to block 716, where the worker is also re-assigned to the SPLIT_PENDING queue. Processing then continues to decision block 718, where a determination is made if the SPLITTABLE queue is empty. If it is, processing returns to a calling process to perform other actions. If the SPLITTABLE queue is not empty, then processing flows to decision block 720, where a determination is made whether the next available worker in the SPLITTABLE queue has been split too often. As noted above, in one embodiment, this may be based on a time stamp, or other criteria. In any event, in one embodiment, if the next available worker has not be split too often based on the time stamp (or other criteria), then processing loops back to decision block 702; otherwise, processing flows to a timer loop at block 722 to wait for a given time, event, or the like. From block 722, the process loops back to decision block 702, until the event, time, or the like, is satisfied.

FIG. 8 illustrates a logical flow diagram generally showing one embodiment of managing responses from a worker that has received a split request. Thus, in one embodiment, process 800 of FIG. 8 might be performed concurrent with, or asynchronous to, process 700 of FIG. 7. Process 800 may also be performed by the coordinator.

Process 800 begins, after a start block, at decision block 802, where a determination is made whether a split response is received from a worker. Such split responses are received as a result of the split requests sent at block 714 of process 700. In any event, if a split response is not received, processing returns to decision block 702 of process 700; otherwise, processing continues to decision block 804.

At decision block 804 a determination is made whether the split response from a worker indicates that the file directory is unsplittable (indicating that the worker determined that it was not able to split off any work), or that the file directory is splittable. In one embodiment, if it is determined that the file directory is splittable, the worker may also provide information about the portion of the file directory that is to be split off and provided to another worker. In one embodiment, such information might include information about the file directory, subdirectory, or other identifier, along with a starting location and ending location within the file directory over which the other worker is to perform the work item. In one embodiment, as described further below, the starting and ending locations might be key entries for the given directory.

If the split response indicates that the file directory is unsplittable, processing flows to block 814; otherwise, if the file directory is splittable, processing flows to block 806.

At block 806, a worker is selected from the IDLE queue. Flowing next to block 808, the selected worker is sent the work item, along with other information, such as an identifier of the file directory, a starting location, and an ending location over which the selected worker is to perform the work item. In one embodiment, the worker is provided such information through a work response message. In any event, as should be readily apparent, the selected worker may actually receive directions to perform the work item over a portion of the file directory rather than an entire file directory. As such, the selected worker might be performing actions over what might be termed a slice or portion of the file directory—a directory slice. However, because in various situations the selected worker could receive an entire file directory, or a slice of the file directory, it should be understood that the usage of the phrase file directory includes a possibility that the worker receives a portion of the file directory, a file directory slice. Thus, the usage of the term file directory includes a file directory slice.

Continuing to block 810, the state structure is modified for the worker that is selected to receive the shared work item. In one embodiment, the coordinator may store in the state structure for the worker information about the work item, the directory over which the worker is to perform the work item, and/or other information, including a time the worker was sent the work item. Process 800 then flows to block 812, where the worker receiving the work item is re-assigned to the SPLITTABLE queue. Processing then flows to block 814.

At block 814, regardless of the split success evaluated at decision block 804, the worker that sent the split response is removed from the SPLIT_PENDING queue and re-assigned to the SPLITTABLE queue. In one embodiment, however, where process 800 is entered from process 700 (from B as illustrated in FIG. 8), there might not be a received split response. In such instance, because there is no worker sending the split response, block 814 might simply not be executed.

In one embodiment, processing returns to decision block 702 of process 700. As noted above, however, because processes 700 and 800 may operate asynchronously to each other, process 800 might, in one embodiment, loop back to decision block 802 from block 814 to wait for another split response to be received.

In any event, processes 700 and 800 may continue to operate to enable splitting of work across a plurality of workers, and thereby seek to maximize parallel execution of the work within a given filesystem, by ensuring that the work is continuously load balanced among the workers.

Figure 9:
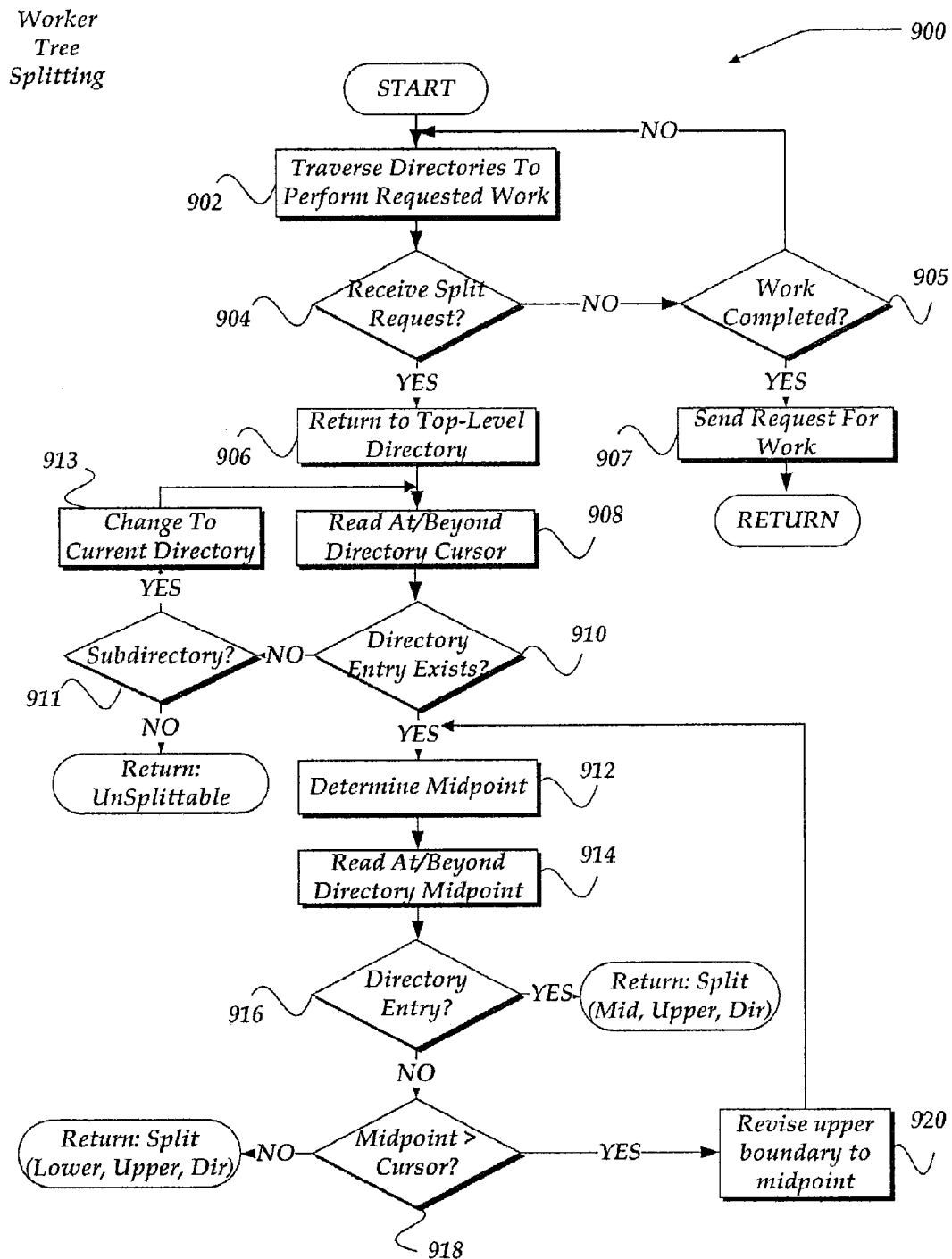
FIG. 9 illustrates a logical flow diagram generally showing one embodiment of a process of a worker treewalk for splitting a file directory for parallel execution of a work item over content within the file directory.

FIG. 9 illustrates a logical flow diagram generally showing one embodiment of a process of a worker treewalk for splitting a file directory for parallel execution of a work item over content within the file directory. Thus, process 900 of FIG. 9 is performed by a worker that has received a work item to be performed on entries within a file directory for the filesystem.

After a worker is assigned a work item to be performed on entries within a file directory, it may commence the designated operations in the work item on entries in the file directory. In one embodiment, the progress of work may begin in an ascending key entry order. Subdirectories may be recursively processed in order.

As discussed above in conjunction with FIG. 4, as a worker progresses through the file directory, the worker maintains a cursor location to identify progress status. In one embodiment, the cursor location includes a stack of directory slices or portions of a file directory, the related key space for the directory slice, and a last processed directory key per slice. After a directory entry is processed, the worker may relocate the cursor past the completed directory entry. Where the directory entry represents a subdirectory, a new directory slice representing the whole subdirectory may be pushed onto the stack and the cursor in the parent directory to the subdirectory is set past the subdirectory. Once a directory has been traversed to completion, it may be removed from the directory stack and the worker will continue to walk the parent directory.

It should be noted that while in one embodiment, a stack mechanism may be employed to manage the progress through a file directory, the invention is not so constrained. Other mechanisms, including, but not limited to tables, databases, files, linked lists, flags, or the like, may also be used to manage progress.

As described below in conjunction with FIG. 9, a worker may receive asynchronous split requests from the coordinator, while performing the work item on entries within a given tree structure of a file directory. It is expected, in one embodiment, that the worker receiving the request the file directory will provide a new directory slice that may be shared with another worker for performing the work item, or the worker will provide an indication that the file directory is unsplittable.

The tree walk mechanism described in FIG. 9 may be implemented such that the worker iterates from a top of the directory slice stack to a bottom to determine if and where the file directory is splittable. However, in another embodiment, the worker may also iterate from bottom to top of the directory slice stack given, for example, information regarding where is the bottom. Briefly, an attempted split might be performed at each level until a split is found. If, however, no split is found on any directory slice within the stack, then the file directory is considered unsplittable. A file directory might be determined to be unsplittable for a variety of reasons, including, for example, that the cursor location is determined to be at the end of the directory, the worker has just re-cursed into a new directory and no entries over which to perform the work item have been read by the worker, or any of a variety of other reasons.

In any event, the worker progresses the treewalk for file directory splitting by seeking to locate a next splittable directory entry key within a neighborhood after a current in-progress directory entry. If no key entry is located within the neighborhood, then the directory slice is considered as unsplittable. A fall through search of the directory key space may be performed if the directory slice is splittable. In one embodiment, the fall through search may be performed between a next available directory entry key and the end key of the directory slice or the upper boundary of the directory slice. In one embodiment, the search may be terminated if the next available entry is found.

Thus, as described, the treewalk process 900 of FIG. 9 for a given file directory (or slice of the file directory) begins, after a start block, at block 902, where the worker begins to traverse the file directory to perform the work item. It is noted that as the worker performs the work item, the worker may provide checkpoint information indicating its progress. Such information may be useable, in one embodiment, should the worker become disconnected, fails, or for a variety of other failure conditions. In one embodiment, the worker may provide such checkpoint information that includes, a worker identifier, a directory slice stack for which the worker is assigned, cursor locations within the stack, and the like. In one embodiment, the checkpoint information may be provided to a shared recovery location, such as a directory location that might be named uniquely by the work item, the worker identifier, and/or a combination of work item, worker identifier, and/or other information.

Processing flows to decision block 904, where a determination is made whether the worker has received a request to split the file directory (or directory slice) to share at least a portion of the file directory with another worker over which to perform the work item. If a split request is not received, processing flows to decision block 905; otherwise, processing continues to block 906.

At decision block 905, a determination is made whether the worker has completed the work item for the file directory or slice, for which the worker is assigned. If not, then the processing loops back to block 902. Otherwise, the processing flows to block 907, where the worker sends a request for work to the coordinator. It should be noted, that at block 907, other information may also be provided to the coordinator through a variety of mechanisms, including a time the worker completed the work item, a status of success or failure of the work item, as well as other information. Processing then returns to a calling process to perform other actions.

At block 906, when the worker receives the request to split the file directory, the worker attempts to determine whether the file directory is splittable. This is performed, in part, at block 906 by locating the top level directory within the file directory or directory slice for which the worker is assigned.

Continuing to block 908, the worker then reads the key space entries for the file directory within a neighborhood of the directory cursor location to determine whether a directory entry is located within the neighborhood. As discussed above, in conjunction with FIG. 4, the neighborhood might be defined, in one embodiment, within the key space to include a next look ahead from the cursor location to a next key entry within the key space. Such key entry might include a key indicating a subdirectory, or a key indicating a file. In one embodiment, there might be no key entry located within the neighborhood of the cursor location. Thus, processing flows to decision block 910, to determine if a directory entry is located within the neighborhood. If one is located, then processing flows to block 910; otherwise, processing flows to decision block 911.

At decision block 911, a determination is made whether there is a next subdirectory, indicated by a key space entry for a next subdirectory, within the directory currently being evaluated. If so, then processing flows to block 913. At block 913, the worker then changes to the located next subdirectory over which to continue the treewalk for file directory splitting. Processing then loops back to block 908, where, instead of examining the top level directory, the selected next subdirectory is examined.

If, however, at decision block 911, no subdirectory is detected, then the worker determines that the file directory is unsplittable. The worker then returns a split response message to the coordinator indicating that the file directory is unsplittable. In one embodiment, the process might then flow to decision block 905, to determine whether the worker has completed its work item over the assigned file directory.

As indicated above, if a directory entry is located at decision block 910, then processing flows to block 912. At block 912, the worker then determines whether there is work in the remaining portion of the file directory that might be sharable with another worker. This is determined by locating, at block 912, a midpoint within the file directory's key space that is about halfway between the cursor location and an upper boundary for the key space. That is, the midpoint is determined to be about halfway between the next available directory entry key and an end key of the directory slice assigned to the worker. It should be noted that an exact division of the key space might not arise, where there is an odd number of key space entries, for example. It such or similar instances, a closest next key space entry might be used to determine the midpoint.

Processing moves next to block 914, where a reading within a neighborhood of the midpoint within the key space is performed. Flowing to decision block 916, a determination is then made to determine if an entry is detected within the neighborhood. If no entry is found within the neighborhood, then it might be assumed that there are no more entries over which to perform the work item above the determined midpoint. However, if there is an entry detected within the directory's key space (whether the directory entry is a subdirectory entry or a file entry), then it is determined that the file directory or slice being walked by the worker is splittable. The worker may then return a split response to the coordinator indicating that the file directory is splittable. In one embodiment, the worker might include information that includes, but is not limited to, a file directory identifier, information about the work item, a midpoint location, and an upper directory location. In one embodiment, the worker then determines that its work item is to be performed up to the midpoint location rather than the originally assigned portion of the file directory. Thus, the process might flow to decision block 905.

If, at decision block 916, no directory entry is located within the neighborhood of the midpoint within the key space (no subdirectory key entry or file key entry), then processing flows to decision block 918, where a determination is made whether the midpoint location is at or above (e.g., after) the cursor location in the key space. If it is, then it is determined that there might be entries between midpoint and the cursor location that might justify splitting the file directory and sharing the work between workers. Thus, if the midpoint location is after the cursor location processing flows to block 920, where the worker sets the upper boundary for the file directory for the key space slice beings walked to the currently determined midpoint location. Processing then loops back to block 912, where a new midpoint location is determined based on the revised upper boundary location. In this manner, the tree might be bisected and further analyzed for possible directory splitting.

However, if, decision block 918, it is determined that the midpoint location is before (or below) the cursor location within the key space for the directory slice being walked, then it is determined that the directory slice is still splittable. The worker may then provide a split response to the coordinator indicating that the directory is splittable. In one embodiment, the worker might include information that includes, but is not limited to, a file directory identifier, information about the work item, that the lower bound is the cursor location determined between blocks 908 and 910; and the upper boundary location. In one embodiment, processing flows to decision block 905, where a determination is made whether the work item is completed.

It is recognized that there may be instances where the coordinator might fail, thereby necessitating a restart process. Such restart process may be performed in any of a variety of ways. For example, in one embodiment, when a worker detects that no communication has been received from the coordinator, such as a keep-alive, ping, or the like, the workers might communicate and select one of the workers to become a coordinator. The selection might be based on any of an election mechanism, a worker identifier priority order, or the like. In one embodiment, the worker that might be selected to become a coordinator might be selected from the workers in the IDLE queue.

However, it is recognized that other restart mechanisms may also be employed. For example, the operating system, or other process, might detect the failure of the coordinator perform a re-boot, restart on the coordinator. In another embodiment, a new coordinator might be created and assigned to manage the work redistribution for the active workers. Thus, any of a variety of mechanisms might be used. Furthermore, during the failure and restart process for the coordinator, the workers might continue to perform their work item over their assigned file directory, performing, for example, absent receiving further directions for splits, or re-assignments from a coordinator. In addition, information to be communicated to the coordinator when one is restarted, may reside in a location that may be shared, and therefore, maintained independent of a status of the coordinator. Thus, when the coordinator is re-started, or a new coordinator is assigned, the coordinator may examine the shared location to determine status, and next actions to be performed by the coordinator.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
   a transceiver to send and receive data over a network; and
   a processor configured to include at least one worker thereon that is operative to perform at least one work item on at least one entry of a file system, comprising:
      determining a coordinator based in part on at least a communication between the at least one worker and at least one other worker, wherein the determination of the coordinator is based on at least one of, an election, or a worker priority order;
      receiving a work item to be performed on entries within a file directory of the file system;
      performing the work item on at least one of the entries within the file directory, progress of performance of the work item being indicated by a location of a pointer within a key space that corresponds to the file directory; and
      in response to receiving a request to split off work for parallel execution on the file directory from the coordinator, performing actions, including:
         indicating that the file directory is splittable to share at least a portion of the file directory with at least one other worker, if a directory entry is located within a determined value of a neighborhood that is employable to look ahead of the pointer location and also if a directory entry is located within a determined value of a neighborhood that is employable to look ahead of a midpoint that is located within a determined middle of the key space; and
         indicating that the file directory is unsplittable and unable to share at least a portion of the file directory with at least one other worker, if the directory entry is unlocatable within the neighborhood of the midpoint and the midpoint is also located before the location of the pointer.

2. The network device of claim 1, wherein if the file directory is splittable, providing a location of the midpoint and an upper boundary within the key space as a range of entries within the file directory that is splittable to another worker.

3. The network device of claim 1, wherein determining if the file directory is splittable further comprises:
   if the directory entry is unlocatable within the neighborhood of the pointer location, searching for a subdirectory entry after the pointer location;
   if the subdirectory entry is located after the pointer location, employing the located subdirectory to determine another pointer location within the subdirectory; and
   if the subdirectory entry is unlocatable after the pointer location, indicating that the file directory is unsplittable.

4. The network device of claim 1, wherein determining if the file directory is splittable further comprises:
   if the directory entry is unlocatable within the neighborhood of the midpoint, then:
      if the midpoint is before the pointer location within the key space, indicating that the file directory is unsplittable; and
      if the midpoint is after the pointer location within the key space, then:
         setting an upper boundary for the file directory within the key space as the midpoint;
         determining a new midpoint based on the setting of the upper boundary; and
         indicating a splittability of the file directory using the new midpoint.

5. The network device of claim 1, wherein the at least one worker is configured to checkpoint progress in the file directory at least by writing out information about the pointer location to a shared recovery directory.

6. The network device of claim 1, wherein coordination of the at least one worker and another worker is performed by the coordinator operating on the network device or another network device, the coordinator employing queues to track a state of the worker and the other worker.

7. A system for managing changes to entries within a file directory, comprising:
   a processor that is operative to enable actions, including assigning a work item to be performed over entries within the file directory of a file system; and
   a first worker operating within the processor or another processor and performing actions, including:
      determining a coordinator based in part on at least a communication between the first worker and at least one other worker, wherein the determination of the coordinator is based on at least one of, an election, or a worker priority order;
      receiving the assigned work item;
      performing the work item on at least one of the entries within the file directory, progress of performance of the work item being indicated by a pointer location within a key space that corresponds to the file directory; and
      in response to receiving a request to split off work for parallel execution on the file directory from the coordinator, performing actions, including:
         indicating that the file directory is splittable to share at least a portion of the file directory with at least one other worker, if a directory entry is located within a determined value of a neighborhood that is employable to look ahead of the pointer location and also if the directory entry is located within a determined value of a neighborhood that is employable to look ahead of a midpoint that is located at a determined middle of the key space; and
         indicating that the file directory is unsplittable and unable to share at least a portion of the file directory with at least one other worker, if the directory entry is unlocatable within the neighborhood of the midpoint and the midpoint is located before the location of the pointer.

8. The system of claim 7, wherein the coordinator performs actions, further comprising:
    determining a number of available workers within an idle queue of workers, wherein a second worker is included within the idle queue;
    selecting the first worker from a splittable queue of workers, if within a defined time period a split request is nonexistent for the first worker;
    sending the request to the selected first worker to split the file directory to share at least a portion of the file directory with a second worker;
    receiving from the selected first worker that the file directory is splittable and a range of the file directory to be sent to the second worker; and
    providing to the second worker the range of the file directory that is split from the selected first worker.

9. The system of claim 7, wherein determining if the file directory is splittable further comprises:
    if the directory entry is unlocatable within the neighborhood of the pointer location, searching for a subdirectory entry after the pointer location;
    if the subdirectory entry is located after the pointer location, then employing the located subdirectory for determining another pointer location within the subdirectory; and
    if the subdirectory entry is unlocatable after the pointer location, indicating that the file directory is unsplittable.

10. The system of claim 7, wherein determining if the file directory is splittable further comprises:
    if the directory entry is unlocatable within the neighborhood of the midpoint, then:
        if the midpoint is before the pointer location within the key space, indicating that the file directory is unsplittable; and
        if the midpoint is after the pointer location within the key space, then:
            setting an upper boundary for the file directory within the key space as the midpoint;
            determining a new midpoint based on the setting of the upper boundary; and
            indicating the splittability of the file directory using the new midpoint.

11. The system of claim 7, wherein the system comprises a plurality of network devices, each network device being configured to operate as a peer node within a cluster system to provide distributed storage for the file directory.

12. The system of claim 7, wherein the coordinator performs actions to distribute work items over a plurality of workers using state information about each worker in the plurality of workers.

13. The system of claim 7, wherein the coordinator performs actions, further comprising:
    if the first worker is determined to have disconnected communications with the coordinator for at least a defined time, then moving at least one work item assigned to the disconnected first worker to a recovery queue; and
    if assigning at least one work item to another worker, examining the recovery queue for at least one work item available to be assigned to the other worker.

14. A method for managing changes to entries within a file directory with a computing device that enables actions, comprising:
    determining a coordinator based in part on at least a communication between at least one worker and at least one other worker, wherein the determination of the coordinator is based on at least one of, an election, or a worker priority order;
    receiving a work item to be performed by the at least one worker on entries within a file directory;
    performing the work item by the at least one worker on at least one of the entries within the file directory, progress of performance of the work item being indicated by a location of a pointer within a key space that corresponds to the file directory; and
    in response to receiving a request to split off work for parallel execution on the file directory from the coordinator, performing actions, including:
        if a directory entry is located within a determined value of a neighborhood that is employable to look ahead of the pointer location and also if a directory entry is located within a determined value of a neighborhood that is employable to look ahead of a midpoint that is located at a determined middle of the key space, indicating that the file directory is splittable to share at least a portion of the file directory with at least one other worker; and
        if the directory entry is unlocatable within the neighborhood of the midpoint and the midpoint is located before the location of the pointer, indicating that the file directory is unsplittable and unable to share at least a portion of the file directory with at least one other worker.

15. The method of claim 14, wherein determining if the file directory is splittable further comprises:
    if the directory entry is unlocatable within the neighborhood of the pointer location, searching for a subdirectory entry after the pointer location;
    if the subdirectory entry is located after the pointer location, then employing the located subdirectory for determining another pointer location within the subdirectory; and
    if the subdirectory entry is unlocatable after the pointer location, indicating that the file directory is unsplittable.

16. The method of claim 14, wherein determining if the file directory is splittable further comprises:
    if the directory entry is unlocatable within the neighborhood of the midpoint, then:
        if the midpoint is before the pointer location, indicating that the file directory is unsplittable; and
        if the midpoint is after the pointer location within the key space, then:
            setting an upper boundary for the file directory within the key space as the midpoint;
            determining a new midpoint based on the setting of the upper boundary; and
            indicating the splittability of the file directory using the new midpoint.

17. The method of claim 14, wherein the actions further comprising:
    requesting a split request to be received such that a worker is moved higher in priority within a splittable queue of workers than another worker within the splittable queue.

18. The method of claim 14, wherein if the file directory is splittable, enabling the coordinator operating on at least one of the computing device and another computing device to perform actions to send another work item including a range of directory entries to a worker on at least one of the computing device and the other computing device.

19. The method of claim 14, wherein receiving a request to split the file directory is based on sending a request for a split based in part on at least one of a type and a size of content within the file directory.

20. The method of claim 14, wherein receiving the work item to be performed further comprises receiving the work item by the at least one worker within an idle queue, and the at least one worker receives the request to split the file directory while in a splittable queue, wherein the idle queue and splittable queue are managed by the coordinator operating on at least one of the computing device and another computing device.

21. The method of claim 14, further comprising the coordinator enabling actions to distribute work items over a plurality of workers using state information about each worker in the plurality of workers.

22. The method of claim 14, further comprising the coordinator enabling actions, comprising:
   if a first worker is determined to have disconnected communications with the coordinator for at least a defined time, then moving at least one work item assigned to the disconnected first worker to a recovery queue; and
   if assigning at least one work item to a second worker, examining the recovery queue for at least one work item available to be assigned to the second worker.

23. A non-transitory processor-readable storage medium that includes data, wherein the execution of the data on a computing device enable actions, comprising:
   determining a coordinator based in part on at least a communication between at least one worker and at least one other worker, wherein the determination of the coordinator is based on at least one of, an election, or a worker priority order;
   receiving a work item to be performed by the at least one worker on entries within a file directory;
   performing the work item by the at least one worker on at least one of the entries within the file directory, progress of performance of the work item being indicated by a pointer location within a key space that corresponds to the file directory; and
   in response to receiving a request to split off work for parallel execution on the file directory from the coordinator, performing actions, including:
      if a directory entry is located within a determined value of a neighborhood that is employable to look ahead of the pointer location and also if a directory entry is located within a determined value of a neighborhood that is employable to look ahead of a midpoint that is located at a determined middle of the key space, indicating that the file directory is splittable to share at least a portion of the file directory with at least one other worker; and
      if the directory entry is unlocatable within the neighborhood of the midpoint and the midpoint is located before the location of the pointer, indicating that the file directory is unsplittable and unable to share at least a portion of the file directory with at least one other worker.

24. The non-transitory processor-readable storage medium of claim 23, wherein determining if the file directory is splittable further comprises:
   if the directory entry is unlocatable within the neighborhood of the pointer location, searching for a subdirectory entry after the pointer location;
   if the subdirectory entry is located after the pointer location, then employing the located subdirectory for determining another pointer location within the subdirectory; and
   if the subdirectory entry is unlocatable after the pointer location, indicating that the file directory is unsplittable.

25. The non-transitory processor-readable storage medium of claim 23, wherein determining if the file directory is splittable further comprises:
   if the directory entry is unlocatable within the neighborhood of the midpoint, then:
      if the midpoint is before the pointer location, indicating that the file directory is unsplittable; and
      if the midpoint is after the pointer location within the key space, then:
         setting an upper boundary for the file directory within the key space as the midpoint;
         determining a new midpoint based on the setting of the upper boundary; and
         indicating the splittability of the file directory using the new midpoint.

26. The non-transitory processor-readable storage medium of claim 23, wherein if the file directory is splittable, the coordinator operating on at least one of the computing device and another computing device performs actions to send another work item including a range of directory entries to a worker on at least one of the computing device and the other computing device.

27. The non-transitory processor-readable storage medium of claim 23, wherein receiving a request to split the file directory is based on sending a request for a split based in part on at least one of a type and a size of content within the file directory.

28. The non-transitory processor-readable storage medium of claim 23, wherein the actions further comprising:
   requesting a split request to be received such that worker is moved higher in priority within a splittable queue of workers than another worker within the splittable queue.

29. The non-transitory processor-readable storage medium of claim 23, wherein receiving the work item to be performed further comprises receiving the work item by the at least one worker within an idle queue, and the at least one worker receives the request to split the file directory while in a splittable queue, wherein the idle queue and splittable queue are managed by the coordinator operating on at least one of the computing device and another computing device.

* * * * *